Oct. 17, 1933.   J. C. SHAW ET AL   1,930,567
LOCKING DEVICE FOR MACHINE TOOL WORKTABLES
Filed April 14, 1931
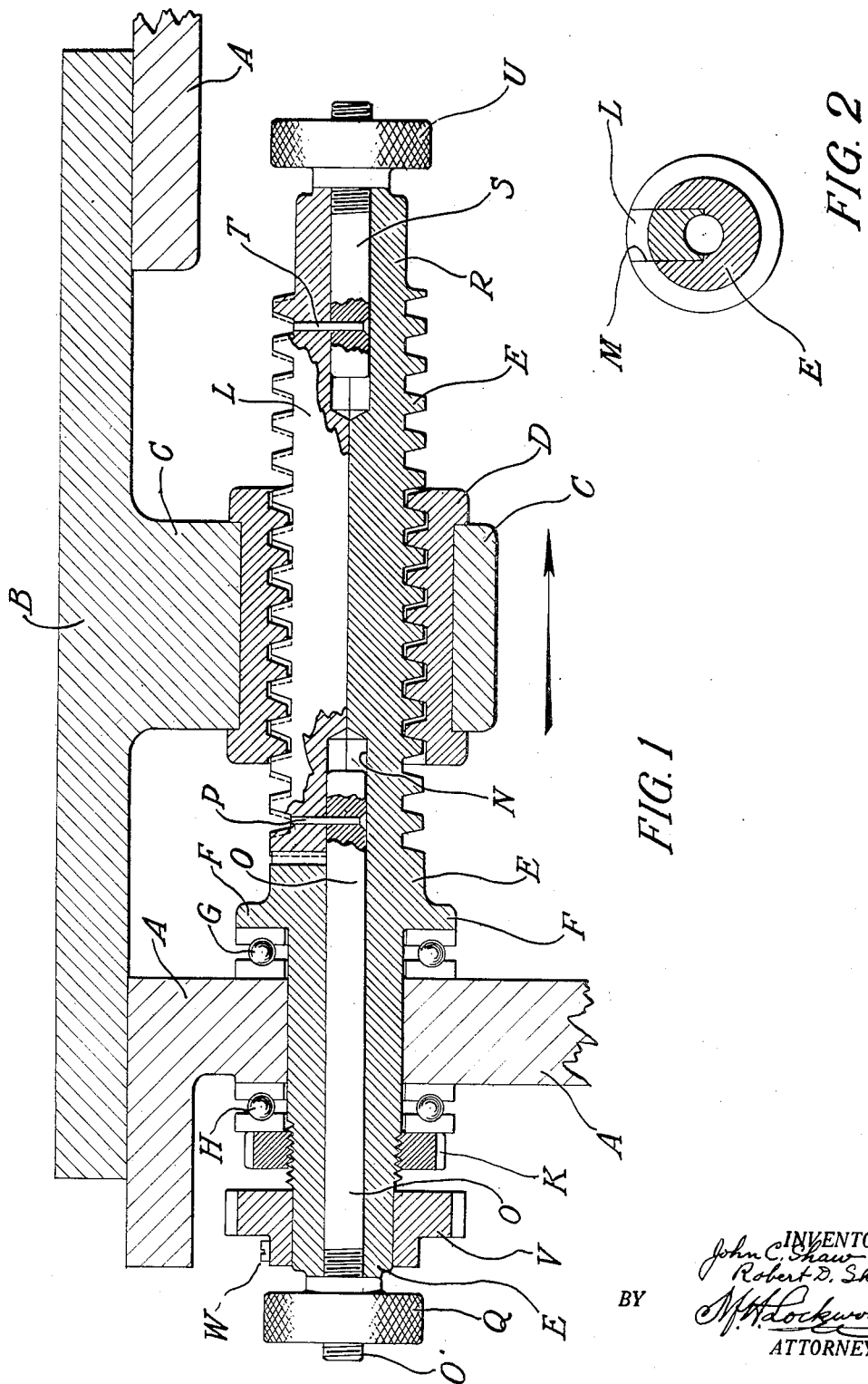

Patented Oct. 17, 1933

1,930,567

UNITED STATES PATENT OFFICE 1,930,567

LOCKING DEVICE FOR MACHINE TOOL WORKTABLES

John C. Shaw and Robert D. Shaw, Brooklyn, N. Y., assignors to Pratt & Whitney Company, Hartford, Conn., a corporation of New Jersey Application April 14, 1931. Serial No. 529,990

3 Claims. (Cl. 90—58)

This improvement relates more particularly to an improved means for locking the work table of a machine tool, wherein the table for supporting the work is adapted to be moved and positioned by a lead screw and wherein it is required to accurately lock the table in a predetermined position, after it has been properly located.

Obviously, the improvement may be adapted for any type of machine wherein the work or work table or the like is intended to be definitely located, and then locked in a fixed position. In the present instance the improvement has been designed for and particularly adapted to the work table of a work locating device, substantially as shown and described in Shaw and Shaw Patent No. 1,757,929 of May 6, 1930, for work positioning mechanism for machine tools.

In machines of this character, where precise location of the work is required, it is fundamental to accurately lock the work table to the lead screw in its exact position, after it has been properly located. It is well known that if the lead screw, which is usually mounted in the base of the machine for rotative cooperation with a threaded nut on the work table, is permitted any shaking or lost motion longitudinally, with reference to the base member, it becomes useless as a means for accurately positioning the work table and maintaining it definitely in the located position.

Accordingly, one object of the present improvement is to provide means for mounting the lead screw in the base member (or the nut in some cases) for rotation in a relatively fixed position without any longitudinal shaking movement or lost motion.

After mounting the screw (or the nut) for rotation in a fixed position, the principal object of the improvement is to provide means for locking the nut to the screw after relative rotation of the nut and screw has been utilized for definitely and precisely locating the table in the desired position.

This is preferably accomplished by providing a longitudinally shiftable section of the screw threads, movable out of normal register for taking up any lost motion between the nut and screw and locking them together.

A further object is to provide means such as a bolt or the like, extending longitudinally of the screw, and a knurled nut or similar device for effecting the shifting of the shiftable section of the threads for locking of the table (nut) to the screw in any position.

The preferred form of the improved locking device is shown in the accompanying drawing, in which Fig. 1 is a longitudinal section, partially broken away, of the device and Fig. 2 is a cross section of the screw showing the inserted shiftable section.

Referring to the drawing, the base A of the machine, which is shown in section and broken away, has mounted thereon, in the usual or any preferred manner, a slidable member or work table B arranged to slide in the usual manner. A depending lug C extends downward from the underside of the slidable table and is provided with a screw threaded nut D, mounted therein, substantially as indicated in Fig. 1 of the drawing.

A lead screw E, adapted to cooperate with the nut D, is mounted in a bearing on an upright portion of the base A, as shown at the left in Fig. 1. In order to prevent shaking or lost motion longitudinally of the screw, the bearing or mounting of the screw in the base A may be of any suitable form capable of holding the screw for rotation in fixed position, without longitudinal displacement. The usual method of mounting the screw for obtaining this result is by means of wide collars and when such collars are used, it is necessary to lubricate them, which results in placing a thin film of oil between the respective collars and the base member. It has been found that the thickness of such an oil film, in ordinary practice, will be sufficient to interfere with the accuracy of the locking mechanism and consequently, in the present improvement, an important feature is the provision of thrust ball bearings for rotatably mounting the screw in the base, which gives a bearing which may be so adjusted as to give practically metal to metal contact, thereby eliminating entirely any lost motion or shaking between the base member and the screw.

In the present instance, the screw is provided with a flange F against which a thrust ball bearing G is mounted on one side of the base member A and another thrust ball bearing H is mounted on the other side of the base member, the entire assemblage being clamped to the base member by means of a nut K, threaded on to the projecting end of the screw, as shown in Fig. 1. By this arrangement, it will be seen that the thrust ball bearings G and H can be closely adjusted, by means of the screw threaded nut K, so as to practically eliminate any shaking or lost motion in the bearings.

In normal manufacture, the lead screw and the cooperating nut are made a close working fit but it is not practical to have such a close fit, as to eliminate entirely back lash or lost motion. It is well known that any such back lash is found on the sides of the threads opposite the direction of thrust of the screw. For instance in Fig. 1, the screw threads are shown as thrusting or operating to move the table toward the right, as indicated by the arrow, and hence the threads of the screw and nut are shown in close contact on the right hand faces of the screw threads, while spaces are indicated (exaggerated in size) on the left hand side of the threads of the screw, representing the back lash.

In order to take up this back lash and prevent any dislocation of the work table, after it has been accurately positioned by means of the direct thrust motion of the screw, means is provided for locking the nut and the screw together with the thrust faces of the screw and nut in positive contact. In the present instance, this locking device comprises a longitudinally extending shiftable or slidable key-like member L mounted for a limited longitudinal movement in a groove or key-slot M in the screw, as indicated in Fig. 2 of the drawing.

For accurately machining the screw and the inserted shiftable locking member L, the latter is temporarily secured in fixed position in the slot or groove M, before turning or cutting the threads, after which the threads are carefully turned or machined on the body of the screw and on the inserted member L, so that the threads on the screw and the section, afterwards movable, are continuous and in perfect register when originally produced or formed.

A hole N is preferably bored axially in the left end of the screw as shown in Fig. 1, and a connecting rod O passing through the hole N with a sliding fit, is secured to the shiftable inserted member L by means of a rivet P, substantially as indicated, or in any other suitable manner. The end of the connecting rod O is screw-threaded at O' and provided with a knurled nut Q thrusting against the projecting end of the screw E, so as to provide for shifting the locking member L relative to the body of the screw and holding the table locked to the screw, as indicated by dotted lines in Fig. 1.

It is evident that the shiftable member locking device should be moved in the other direction and may be preferably operated from the other end of the screw if the direction of thrust should be reversed for accurately positioning the table. For this purpose, it is preferable to extend the body of the screw, as shown at R, and bore out this end of the screw axially and insert therein a corresponding rod S which is secured to the right hand end of the locking member L by the rivet T, as shown in Fig. 1. Another knurled head U is shown threaded on the end of the rod S for adjustment of the locking member, when the thrust is reversed as described. Obviously, one of the knurled nuts (Q or U) should be loosened when the other is utilized for moving the locking member to lock the table to the screw.

For rotating the screw to move the table for locating the work any suitable means may be employed, such as the gear V secured to the projecting end of the screw by a set screw W or otherwise. The screw may be rotated by a magnetic clutch mechanism substantially as described in the aforementioned patent.

The operation of the device will be readily understood from the foregoing description and it will be understood that when the ball bearing mounting of the screw to the base member is accurately adjusted so as to eliminate any lost motion or longitudinal shake, the table may be accurately positioned by rotation of the screw and when properly so located may be locked to the screw by shifting the locking member L longitudinally. This is adapted to be effected by means of the knurled nut Q, (when the thrust is the direction of the arrow), thereby preventing any change in the position of the table after it has been once located. Absolute accuracy is assured by the proper adjustment of the ball bearing mounting of the screw.

Obviously, the locking means described will operate in substantially the same manner if the screw remains stationary and the nut is rotated. In the latter case, the locking may be effected in the same manner, that is, by shifting a locking segment of the screw threads in a direction opposite the direction of thrust, to take up the lost motion or back lash between the threads of the nut and the threads of the screw and thereby lock the table to the screw.

While the preferred form of the locking device has been shown, it will be understood that various modifications in the specific details and arrangements may be made without departing from the spirit and scope of the invention.

We claim:—

1. In a machine of the character described, the combination with a base member, of a work table slidably mounted thereon, a lead screw mounted for rotation in fixed relation to the base member, a nut fixed on the work table for cooperation with said screw for positioning the table, said screw being provided with a longitudinal key-way groove and an axial bore connected with said groove, a movable key-like member threaded the same as the screw and slidably mounted in said groove, means including a rod in said bore connected with said key-like member and having a knurled nut thereon engaging the end of said lead screw for shifting said key-like member and clamping the table and lead screw together in any angular position of the latter and without changing their relative positions longitudinally, whereby the table and lead screw are locked together in their exact positions of adjustment.

2. In a machine of the character described, the combination with a base member, of a work table, a lead screw cooperating with said table for moving the latter, said screw having a key-way with a connecting axial bore, a longitudinally shiftable key-like member threaded the same as the screw and slidable in said key-way and means including a rod-like axial extension of said key-like member slidable in said bore and provided with a nut engaging the end of the lead screw for shifting said key-like member longitudinally of the lead screw and clamping the table to the lead screw in any angular position of the latter, whereby the table and lead screw are frictionally locked together in their exact position of adjustment.

3. In a machine of the character described the combination of a work table, a base upon which said table is mounted to slide, a threaded nut carried by said table, a lead screw cooperating with said nut and mounted in the base member for rotation in a fixed position, said screw having a key-way with axial extensions at each end, a shiftable key-like member threaded the same as and extending longitudinally of the lead screw, said key-like member having axial extensions at each end fitting the axial extensions of said key-way and a knurled nut on each of said axial extensions of the key-like member cooperating with the respective ends of the lead screw for clamping the table and lead screw together in any angular position of the latter without changing their relative positions longitudinally, one of said knurled nuts being used when the lead screw is turned in one direction and the other when the screw is turned in the other direction, whereby the table is locked in its exact position of adjustment whether the adjustment is made by turning the screw in one direction or the other.

JOHN C. SHAW.
ROBERT D. SHAW.